United States Patent [19]

Egenolf

[11] Patent Number: 5,891,929

[45] Date of Patent: Apr. 6, 1999

[54] POLYETHYLENE PRODUCTION VIA LASER

[76] Inventor: Steven P. Egenolf, 8095 Black Oak Dr., Plainfield, Ind. 46168

[21] Appl. No.: 940,603

[22] Filed: Sep. 30, 1997

[51] Int. Cl.$^6$ ...................................................... C08F 2/46
[52] U.S. Cl. .................................................... 522/2
[58] Field of Search ..................................... 522/2

[56] References Cited

U.S. PATENT DOCUMENTS 3,405,045  10/1968  Hoskins .
3,477,932  11/1969  Parts et al. .

OTHER PUBLICATIONS

Oraevskii et al, Laser Polymerization in gases Sov. J. Quant Electron, vol. 4, No. 5, Dec. 1974.

*Primary Examiner*—Nathan M. Nutter
*Attorney, Agent, or Firm*—Daniel J. O'Connor

[57] ABSTRACT

A polyethylene production method and apparatus which utilizes laser energy applied to a reaction chamber containing ethylene gas or liquid.

Particular types of lasers such as carbon monoxide or carbon dioxide lasers have been found to generate the precise frequencies needed to produce the required polymerization of ethylene into polyethylene.

The system may utilize a pump or compressor depending upon the ethylene source.

Fiber-optic cables may be included depending upon the particular manufacturing requirements.

1 Claim, 1 Drawing Sheet

POLYETHYLENE PRODUCTION VIA LASER

BACKGROUND AND OBJECTS OF THE INVENTION

The present invention is related to the polyethylene plastic arts and, in particular, to a novel method for producing such resins.

As is known in the art, large manufacturing plants are currently used to produce polyethylene resins from ethylene gas or ethylene liquid.

Such art has been highly developed due to the ever-increasing use of plastic resins in all industries and technologies.

The need for efficient and economical production of polyethylene plastics is therefore well-established in the art.

The safe production of such materials for environmental and worker safety reasons is also of paramount importance in the polyethylene plastic arts.

Accordingly, it is an object of the present invention to demonstrate a novel polyethylene production apparatus and method to more efficiently generate such materials.

It is also an object of the invention to set forth a polyethylene production method which may be economically utilized for large-scale production.

It is a further object of the invention to show a novel polyethylene production method which is more environmentally sound by reason of its increased manufacturing efficiency.

It is also an object to demonstrate a system which utilizes recent advances in laser technology in a novel way to improve mass-production techniques.

These and other objects of the invention will be apparent to those of skill in the art from the description which follows.

PRIOR ART PATENTS AND REFERENCES

U.S. Pat. No. 5,441,569, assigned to the U.S. Department of Energy, illustrates the use of laser technology as applied to industrial processes. In this design, a first laser is used to heat a substrate and a second laser irradiates gas to be used as a coating on the substrate.

It has also been known in the art that lasers may be applied to chemical reactants to create a desired reaction by supplying energy at a precise frequency. See Laser Chemistry, Scientific American, May, 1979.

Carbon monoxide lasers have been tested as part of laser weapons programs although such have not been found to be useful in widespread practice. See The Laser Guidebook, McGraw-Hill Books.

Carbon monoxide and carbon dioxide lasers have been produced by Synrad Corp. for medical uses in accord with U.S. Pat. 4,805,182 and 4,837,772.

The prior art does not show or suggest the specific industrial uses described in the present application.

SUMMARY OF THE INVENTION

The invention utilizes lasers for the polymerization of ethylene gas or ethylene liquid to efficiently create polyethylene plastics.

Carbon monoxide or carbon dioxide lasers may be used due to relatively recent advances in the laser arts.

The design may utilize fiber-optic cables if deemed desirable in the particular manufacturing facility. Alternatively, the lasers may be attached directly to a reaction chamber.

Ethylene liquid or ethylene gas is supplied to a reaction chamber where polymerization into polyethylene occurs.

It has been discovered that carbon monoxide or carbon dioxide lasers may supply energy at the precise frequencies needed to drive the ethylene efficiently down the most desired chemical pathway, i.e. to the production of polyethylene plastics.

DESCRIPTION OF THE DRAWING FIGURE

The drawing FIG. 1 illustrates the method steps of the invention in schematic system form.

DESCRIPTION OF A PREFERRED EMBODIMENT

Figure 1:
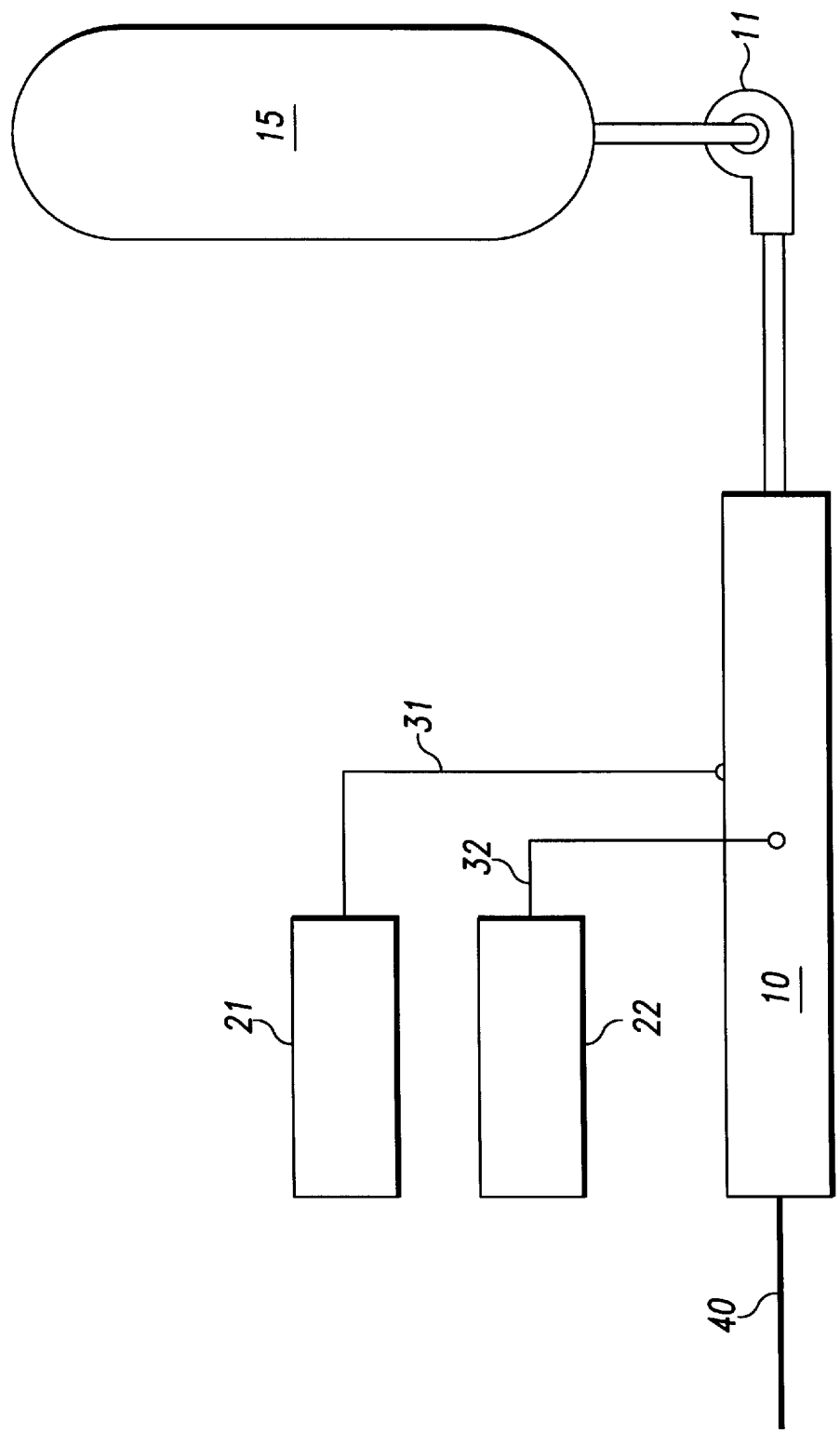

Referring to the drawing figure, numeral 10 indicates a reaction chamber which may be sized as needed for the particular manufacturing or test facility involved.

A compressor or pump 11 is utilized to feed either gaseous or liquid ethylene into the reaction chamber from storage tank 15.

Lasers 21 and 22 are arranged at or near the reaction chamber 10. Fiber-optic cables 31 and 32 may be utilized to supply the laser energy to the reaction chamber if desired.

It is contemplated that lasers of the carbon monoxide or carbon dioxide type would be utilized to supply the required energy for polymerization. Other combinations or types of lasers may be utilized if the required energy frequencies can be attained. It is currently believed, however, that carbon monoxide or carbon dioxide lasers supply the most efficient and cost-effective energy levels required for polymerization of ethylene and conversion into polyethylene.

Polyethylene plastic is thus produced as indicated at exit region 40.

While a particular embodiment has been shown and described, it is intended in this specification to cover all equivalent structures and methods which would reasonably occur to those of skill in the art.

The invention is further defined as set forth in the appended claims.

I claim:

1. A method of producing polyethylene resin by the polymerization of ethylene comprising the steps of:

a) providing a supply of ethylene in a tank, b) providing a separate reaction chamber, c) supplying said ethylene to said reaction chamber, d) providing a supply of laser energy comprising a carbon monoxide laser or a carbon dioxide laser, e) providing at least one fiber optic cable element between said laser and said reaction chamber, f) applying said carbon monoxide laser energy or said carbon dioxide laser energy to said reaction chamber, g) removing produced polyethylene resin from said reaction chamber, wherein said ethylene supply may be in gaseous or liquid form.

* * * * *